Jan. 29, 1929.　　　　　　　　　　　　　　　　　　1,700,723
K. IMHOFF
AERATED CONTACT FILTER FOR SEWAGE TREATMENT
Filed Feb. 8, 1926
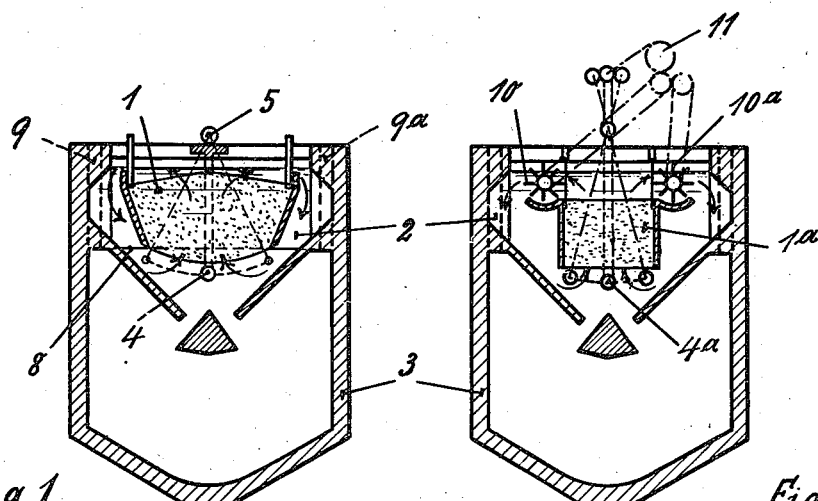
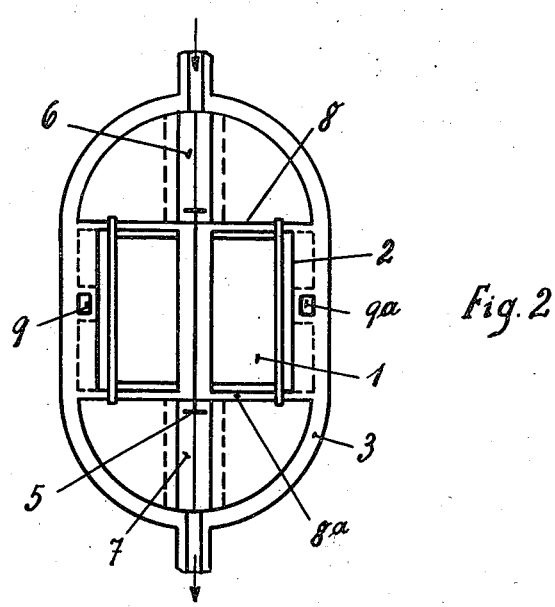
Witnesses:
Inventor:
Karl Imhoff Patented Jan. 29, 1929.

1,700,723

UNITED STATES PATENT OFFICE.

KARL IMHOFF, OF ESSEN, GERMANY.

AERATED CONTACT FILTER FOR SEWAGE TREATMENT.

Application filed February 8, 1926, Serial No. 86,909, and in Germany July 22, 1925.

The subject of my present invention is a new and improved method of sewage treatment in sewage settling tanks with aerated contact and adhesion filters, and an improved apparatus for carrying through therewith my new and improved process.

It has been found that in the sewage settling tanks with "Colloidors" or contact and adhesion filters the efficiency of these "Colloidors" diminishes very quickly in consequence of their getting obstructed by the matter collected in them and in consequence of the rapid growth of the microscopic organisms contained in the sewage liquid. My invention now consists in a new working process and in the construction of such settling tanks with aerated contact and adhesion filters, which method and apparatus not only increases the efficiency of the contact and adhesion filters, but besides overcomes the disadvantage of their getting obstructed and ineffective, to which they have been liable up to the present time.

In order to obtain such results I provide according to my invention a sewage settling tank with a submerged contact and adhesion filter in it and I provide further below the said filter a supply of compressed air, the filter and the air supply being so arranged, that the air rising through the filter will cause a circulation of the sewage liquid upwardly through the filter and down again at the sides of the filter. This supply of compressed air may consist in a number of pipes or air jets, or in a single pipe with air outlet openings, which pipe may be swung to and fro below the filter, so as to cover a greater area of it. The stream of air blown into the filter and the circulation of the sewage liquid through the filter cause increased separation of the colloids out of sewage liquid, and their consequent arrest within the adhesion filter and further it quickens the growth and the ripening of the sludge which accumulates in the filter.

In order to keep up permanently this increased activity of the contact and adhesion filter in the sewage settling tank, my invention consists further in the practice of shaking the contact and adhesion bodies in the filters to cause them to drop or to let go the collected ripened sewage sludge and to make room for fresh separation and growing of sludge. In carrying into practice this further step of my new and improved process of sewage treatment, either the filter itself with the contact and adhesion bodies may be exposed to a mechanically shaking mechanism, or there may be used what I would call a pneumatic shaking of the filter, and this pneumatic shaking is carried through by increasing from time to time the supply of pressure air. The sharper flow of the sewage liquid through the filter in consequence of air supplying pipes blowing with increased pressure through the filter will cause a rinsing off of the ripened sludge which then is carried further by the liquid circulation and is finally settled in the lower part of the sewage settling tank.

In order to make clearer my invention I may proceed now to describe it with reference to a preferred embodiment of my new sewage settling tank with aerated contact or adhesion filter, whereby:

Figure 1 is a vertical cross section, and

Figure 2 is a plan view of the apparatus, while

Figure 3 is a vertical cross section similar to that of Figure 1, but showing a modification of the upper part thereof.

Referring to Figs. 1 and 2:—The aerated contact and adhesion filter 1 is submerged in the sewage of the chamber 2 forming the upper part of a combined settling and digestion tank 2, 3, a so-called Imhoff tank, and through which the sewage flows in the direction of arrows indicated in Fig. 1. Said filter suitably consists of light matters durable in water, for instance fascines or coarse wood-shavings held together by a wire or wickerwork net. The filter 1 is aerated from below, for instance through the perforated pressure-air pipe 4. Around the filter 1, a free space is left in the chamber 2. As soon as air under pressure is supplied, it produces in the filter 1 an upwardly directed water current, which in a circulatory motion returns through said free space along the walls of the chamber 2 to the bottom of the filter 1. By said agitation of the sewage, two conditions essential for the biological action are accomplished: The colloids of the sewage are led along as many contact surfaces as possible, and at the same time oxygen is supplied. In treating the sewage in this improved settling tank with contact and adhesion filters according to my invention further from time to time the supply of air under pressure is increased so that the water agitation becomes so vigorous that the ripe sediments (excess sludge) are torn off and swept into the free space of chamber 2 from where they find their way to the other sludge in the lower part of the chamber 3. In the case of filters 1 having a comparatively large breadth a plurality of air under pressure supply pipes are required, though this can be avoided by a transversely oscillatory suspension of the pressure-air pipe 4 from a point 5 at the top of the chamber 2, whereby said pipe can be moved over the whole bottom of the filter 1 as indicated by the dotted lines in Figure 1.

The filter 1 is suitably arranged in the middle of the chamber 2, so that the sewage flows first through a free part 6 of the latter for its preliminary treatment and finally through a free part 7 thereof for its final treatment in said chamber; said two free chamber parts being guarded by partitions 8 against the action of the current produced by the air under pressure. The sludge settled, and the colloids or sediments washed out of the filter 1, are left in the chamber 2, from which they sink down into the lower or digestion chamber 3, from which the gases are led off through channels 9, 9$^a$.

Referring to Fig. 3:—In this example, the water circulation can be increased and even made independent of the pressure-air by the arrangement of a mechanical water transmission device of known kind which device is arranged in the upper part of the circulating flow between the filter and the free space of the basin 2. For instance, two long undershot water-wheels 10, 10$^a$ having rubber-fitted paddles, may be arranged at the top of the filter 1$^a$ on both sides and extending over the whole length thereof and adapted to be rotated from a common driving-gear 11, from which also the oscillatory movement of the pressure-pipe 4$^a$ can be effected.

The side walls of the aerated contact filter 1, or 1$^a$, are of watertight material, so that the sewage is compelled to pass through the whole height of the filter.

I claim:

1. In the method of treating sewage in settling basins containing contact or adhesion filters: the step of imparting to the sewage a circulating movement, whereby to cause it to flow through the adhesion filter in one direction and to flow back in the opposite direction through the free space of the settling basin outside of the filter.

2. In the method of treating sewage as specified in claim 1: the producing of the said sewage circulation by air under pressure forced from below into said filter in such a way, that a corresponding upward current of the sewage liquid through the filter is produced, which results in a corresponding downward flow of the sewage liquid in the free space of the said basin laterally of the filter.

3. An apparatus for sewage treatment comprising in combination: a sewage filled settling basin; a submerged filter with water tight side walls arranged in the upper part of the settling basin and leaving a free passage space between the sides of the filter and the side walls of the settling basin; and a supply pipe for supplying air under pressure at the bottom of the said filter.

4. An apparatus for sewage treatment comprising in combination: a sewage filled settling basin; a submerged filter with water tight side walls arranged in the upper part of the settling basin and leaving a free passage space between the sides of the filter and the side walls of the settling basin; a supply pipe for supplying air under pressure at the bottom of the said filter; and means for moving said supply pipe over the bottom of the filter.

5. An apparatus for sewage treatment comprising in combination: a sewage filled settling basin; a submerged filter with water tight side walls arranged in the upper part of the settling basin and leaving a free passage space between the sides of the filter and the side walls of the settling basin; a supply pipe for supplying air under pressure at the bottom of the said filter; and mechanical means in the upper part of the filter containing basin, adapted to produce a circulation of the sewage liquid between the walls of the filter and of the basin, and through the filter itself.

In testimony whereof I have hereunto set my hand.

KARL IMHOFF.